(12) United States Patent
Resnick

(10) Patent No.: US 7,870,351 B2
(45) Date of Patent: Jan. 11, 2011

(54) SYSTEM, APPARATUS, AND METHOD FOR MODIFYING THE ORDER OF MEMORY ACCESSES

(75) Inventor: David R. Resnick, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 449 days.

(21) Appl. No.: 11/940,745

(22) Filed: Nov. 15, 2007

(65) Prior Publication Data

US 2009/0150624 A1 Jun. 11, 2009

(51) Int. Cl.
G06F 12/00 (2006.01)

(52) U.S. Cl. ............................ 711/155; 711/5; 711/105; 711/167; 711/169; 711/E12.001

(58) Field of Classification Search ........................ None
See application file for complete search history.

(56) References Cited

U.S. PATENT DOCUMENTS

| | | | |
|---|---|---|---|
| 6,510,497 B1 | 1/2003 | Strongin et al. | |
| 6,564,304 B1 * | 5/2003 | Van Hook et al. | 711/154 |
| 6,601,151 B1 * | 7/2003 | Harris | 711/158 |
| 6,622,225 B1 * | 9/2003 | Kessler et al. | 711/158 |
| 6,628,292 B1 * | 9/2003 | Ashburn et al. | 345/565 |
| 7,047,374 B2 | 5/2006 | Sah et al. | |
| 7,093,094 B2 | 8/2006 | Cismas | |
| 7,107,415 B2 | 9/2006 | Jeddeloh et al. | |
| 7,127,574 B2 | 10/2006 | Rotithor et al. | |
| 7,149,857 B2 | 12/2006 | Jeddeloh | |
| 7,162,567 B2 | 1/2007 | Jeddeloh | |
| 7,209,405 B2 | 4/2007 | Jeddeloh | |
| 7,213,082 B2 | 5/2007 | Jeddeloh | |
| 7,228,387 B2 | 6/2007 | Cai et al. | |
| 2003/0217239 A1 | 11/2003 | Jeddeloh | |
| 2006/0123169 A1 | 6/2006 | Chai et al. | |
| 2006/0212655 A1 | 9/2006 | Jeddeloh et al. | |
| 2006/0215481 A1 * | 9/2006 | Dally et al. | 365/233.5 |
| 2007/0033353 A1 | 2/2007 | Jeddeloh | |
| 2007/0101075 A1 | 5/2007 | Jeddeloh | |
| 2007/0113023 A1 | 5/2007 | Arulambalam et al. | |
| 2007/0113150 A1 | 5/2007 | Resnick et al. | |

OTHER PUBLICATIONS

International Search Report for PCT/US2008/083251, Apr. 30, 2009, 3 pages.
Written Opinion of the International Searching Authority for PCT/US2008/083251, Apr. 30, 209, 4 pages.

* cited by examiner

Primary Examiner—Shawn X Gu
(74) Attorney, Agent, or Firm—Traskbritt

(57) ABSTRACT

Systems and methods for controlling memory access operation are disclosed. The system may include one or more requestors performing requests to memory devices. Within a memory controller, a request queue receives requests from a requestor, a bank decoder determines a destination bank, and the request is placed in an appropriate bank queue. An ordering unit determines if the current request can be reordered relative to the received order and generates a new memory cycle order based on the reordering determination. The reordering may be based on whether there are multiple requests to the same memory page, multiple reads, or multiple writes. A memory interface executes each memory request in the memory cycle order. A data buffer holds write data until it is written to the memory and read data until it is returned to the requestor. The data buffer also may hold memory words used in read-modify-write operations.

23 Claims, 5 Drawing Sheets

SYSTEM, APPARATUS, AND METHOD FOR MODIFYING THE ORDER OF MEMORY ACCESSES

TECHNICAL FIELD

Embodiments relate to computer systems and, more particularly, to operational methods of memory controllers to increase memory access efficiency.

BACKGROUND

In most computer and data processing systems, the main active memory, which is typically random access memory (RAM), is a dynamic random access memory (DRAM). The structure of a DRAM is generally composed of a number of memory cells organized into banks. Each bank corresponds to an array of the memory cells with each cell being respectively associated with a digit of data (e.g., a bit) at a memory address. In particular, memory addresses within a bank are each designated by a row address and a column address, wherein each row address addresses a memory page. Each page of memory, therefore, contains several memory locations corresponding to the different column designations within the page.

When performing a series of access requests, a page request may occur to a bank currently having another page open, which is commonly referred to as a "page conflict," whereupon the previously opened page must first be closed (e.g., pre-charged). After closing the previous page, the requested page may then be opened (e.g., activated) and then the read or write operation to the requested page may be performed. A "page miss" occurs if the currently requested page is found in a bank which has no page open, thus requiring an activation procedure to be performed. A "page hit" is said to occur when a current memory access request is for a page which is already open from a previous memory access request.

Due to the extra processing which must be performed for page conflict and page miss memory accesses relative to page hit requests, the time needed to perform the former two processes is significantly greater than for the latter. In early stages of microprocessor technology development, requests to access a DRAM memory page, for both read and write operations, were received and fulfilled on a first in, first out basis. Such processing may be inefficient, resulting in a large number of page misses and conflicts, and thus requiring an extensive dedication of processor and/or memory controller resources to pre-charging and activating memory pages.

More recently, more advanced processing methods have been developed in which memory access is based on priority. The priority of the access request may be based on various factors such as the type of device sending he request, the type of access requested, the memory address desired to be accessed by the request, etc. The problem with providing memory access strictly on priority, however, is that low priority requests may be denied access for unacceptably long periods of time.

Furthermore, the number of microprocessors in a system, the number of cores in a microprocessor, and the number of process threads per core are increasing greatly in the near term and are expected to continue to increase over the next few years. Systems with hundreds to thousands of execution threads may be envisioned. These systems are often designed such that multiple processor chips access a common memory. These multiples sources requesting access to a common memory place additional pressure on the memory.

One of the effects of the increase of the number of cores and threads will be requirements for greatly increased memory bandwidth, with a major side-effect that the address request stream seen by the memory system will be more random because of the increased number of actually independent or seemingly independent program execution sequences. Increases in the size of level 1 and level 2 caches, which is how total memory bandwidth and latency issues have been addressed in the past by most system implementations, may be less effective and have less opportunity for growth because of the increased number of cores and limits on reasonable die size. Furthermore, an increase in the number of threads being executed in each core will likely reduce average cache hit rates, again resulting in increasing memory traffic.

In current DRAM technology, the time to cycle a memory bank—activate the bank, read or write the requested data, and recharge the bank—is much longer than the data movement time. This long cycle time means that if two requests are close in time but are for the same memory bank the memory input/output (IO) pins become idle for a period of time waiting for the first bank cycle to complete so the second bank cycle can be started. As DRAMs generally have multiple banks that can be cycled independently, this bank timing conflict wastes available memory bandwidth.

With such disparate memory request sources, there is a need for apparatuses and methods to generate improved memory performance in a system environment of multiple threads and multiple processors.

BRIEF DESCRIPTION OF THE DRAWINGS

In the drawings, which illustrate embodiments of the invention.

DETAILED DESCRIPTION

Embodiments disclosed herein include apparatuses and methods for generating improved memory performance in a system environment of multiple threads and multiple processors.

In the following detailed description, reference is made to the accompanying drawings which form a part hereof and in which is shown by way of illustration specific embodiments in which the invention may be practiced. These embodiments are described in sufficient detail to enable those of ordinary skill in the art to practice the invention, and it is to be understood that other embodiments may be utilized, and that structural, logical, and electrical changes may be made within the scope of the present invention.

In this description, circuits and functions may be shown in block diagram form in order not to obscure the present invention in unnecessary detail. Furthermore, specific circuit implementations shown and described are only examples and should not be construed as the only way to implement the present invention unless specified otherwise herein. Block definitions and partitioning of logic between various blocks represent a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

For ease of description, embodiments are discussed below as being used in conjunction with dynamic random access memory (DRAM) devices. Nevertheless, it should be understood that the present invention is not limited to applications involving DRAM. Rather, it is emphasized that embodiments of the present invention may be used in conjunction with other types of random access memories, such as static RAMs (SRAM) and the many different subspecies of DRAMs, including, by way of non-limiting examples, fast page mode DRAM (FPM DRAM), extended data out DRAM (EDO DRAM), burst EDO DRAM, synchronous DRAM (SDRAM), double data rate DRAM (DDR2 DRAM and DDR3 DRAM), Rambus DRAM (RDRAM), etc.

Some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

Figure 1:
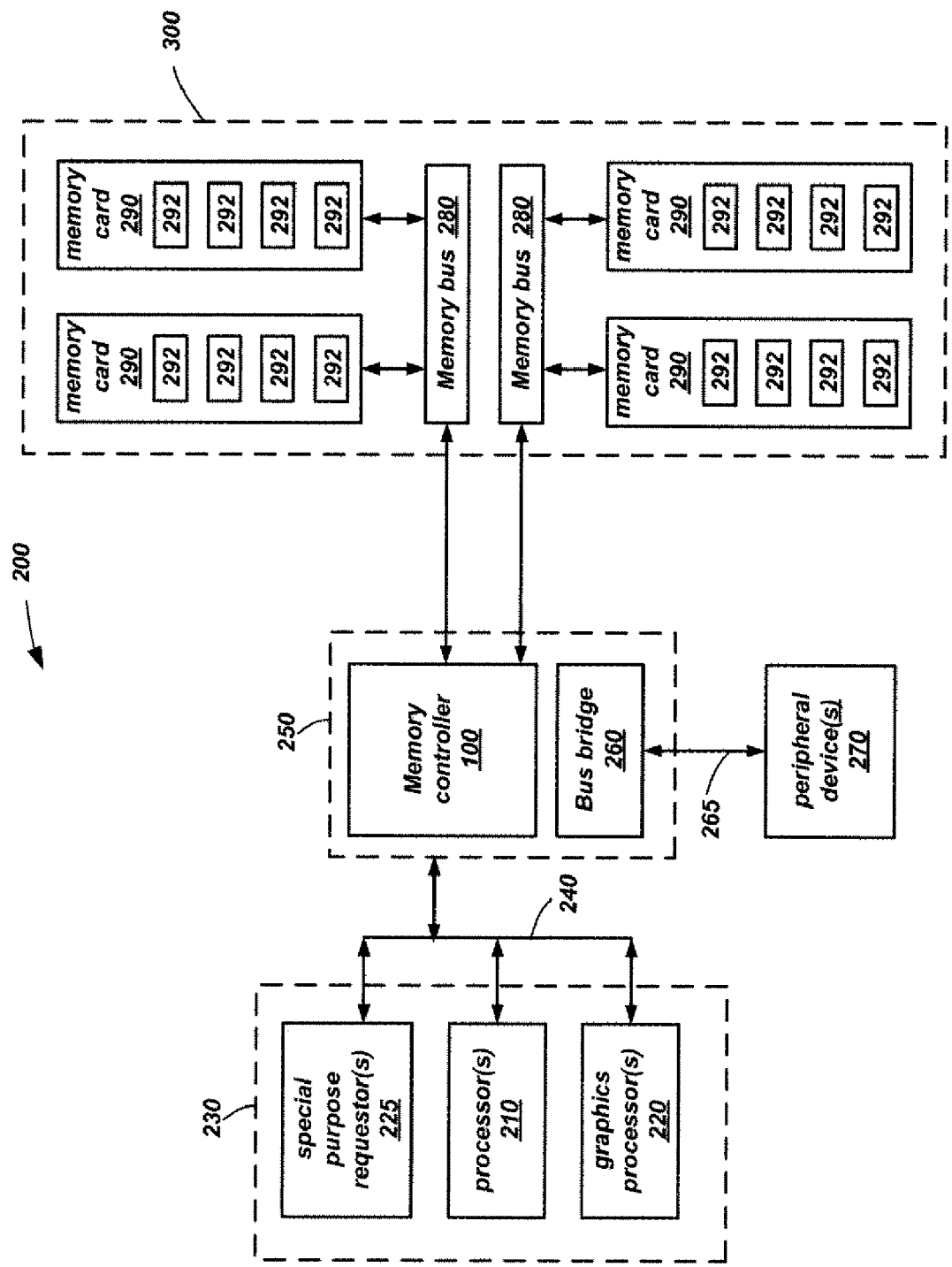
FIG. 1 is a simplified system block diagram of a processing system.

FIG. 1 is a simplified system block diagram of a processing system 200 including a memory controller 100, according to embodiments of the disclosure. The processing system 200 may include one or more processors 210, one or more graphics processors 220, and one or more special purpose requestors 225 coupled to a request bus 240. By way of non-limiting example, these special purpose requestors may include digital signal processors, floating point processors, media processors, network managers, and the like. The processors 210, graphics processors 220 and special purpose requestors 225 may be referred to generically herein as requesters 230. Furthermore, in some embodiments, each of the requesters 230 may include a separate request bus 240 (not shown). The request bus 240 may include elements such as, for example, control signals, address signals, data signals, unique identifiers for each requestor 230, and unique identifiers for multiple processors, or multiple processing threads within a requestor 230.

A bridge unit 250 is coupled to the request bus 2 (or multiple request busses). The bridge unit 250 includes a memory controller 100 and may also include a bus bridge 260. While not shown those of ordinary skill in the art will recognize that the processing system 200 may include multiple memory controllers 100 and multiple bus bridges 260. In addition, the bridge unit 250 may be configured with the memory controller 100 and the bus bridge 260 as separate devices or the bridge unit 250 may integrate the memory controller 100 and the bus bridge 260 into a single device. In addition, the bridge unit 250, or the separate components of the memory controller 100 and bus bridge 260, may be integrated in the same packages or integrated circuits as the requestor units 230

The memory controller 100 is coupled to a memory subsystem 300 through one or more memory buses 280. Each memory bus 280 accepts memory components 290 (also referred to herein as memory cards) which include at least one memory device 292. The memory components 290 may be formed as a memory card or a memory module. Non-limiting examples of memory modules usable in the processing system 200 include single inline memory modules (SIMMs), dual inline memory modules (DIMMs), and Rambus inline memory modules (RIMMs). The memory subsystem 300 including various configurations of memory components 290 and memory devices 292 may be referred to herein simply as memory. Furthermore, the memory components 290 need not be packaged as a card or module. As a non-limiting example, the memory components 290 may be mounted on top of a processor 210 or other requester 230, in a three dimensional packaging configuration.

The bus bridge 260 is coupled to at least one peripheral bus 265. Various devices 270 may be coupled to the peripheral bus 265. As non-limiting examples, these devices may include storage controllers, secondary bus bridges, multimedia processors, legacy device interfaces, and miscellaneous input/output (I/O) devices, such as keyboards, mice, and printers. The bus bridge 260, or memory controller 100, also may be coupled to one or more special purpose high speed buses. In a personal computer, as a non-limiting example, the special purpose bus might be an Accelerated Graphics Port (AGP) bus or Peripheral Component Interconnect Extended (PCI-X) bus, used to couple high performance video cards or other high bandwidth peripherals to the processing system 200.

Those of ordinary skill in the art will recognize that the processing system 20 as illustrated in FIG. 1 is only one, non-limiting example of a processing system with which embodiments of memory controllers 100 may be used. While FIG. 1 illustrates a processing architecture especially suitable for a general purpose computer, such as a personal computer or a workstation, it should be recognized that well known modifications can be made to configure the processing system 200 to become more suitable for use in a variety of applications. For example, many electronic devices which require processing may be implemented using a simpler architecture which relies on a processor 210, and a memory controller 100 coupled to memory components 290, directly to memory devices 292, or combination thereof.

These electronic devices may include, but are not limited to, audio/video processors and recorders, gaming consoles, digital television sets, wired or wireless telephones, navigation devices (including system based on the global positioning system (GPS) and/or inertial navigation), and digital cameras and/or recorders. The modifications may include, for example, elimination of unnecessary components, addition of specialized devices or circuits, and/or integration of a plurality of devices.

Figure 2:
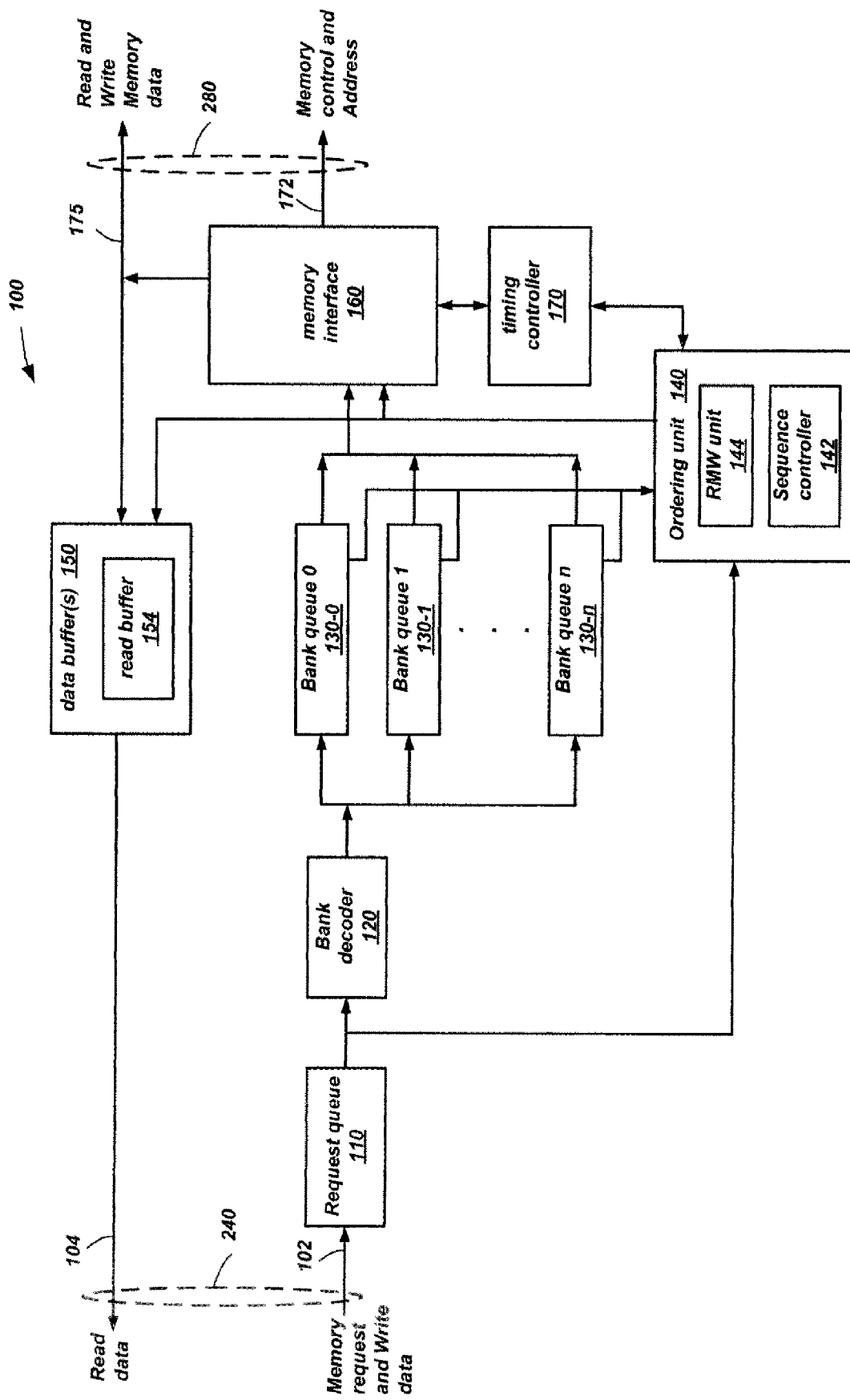
FIG. 2 is a simplified block diagram of a memory controller.

FIG. 2 is a simplified block diagram of the memory controller 100 according to an embodiment of the disclosure. The memory controller 100 includes a request queue 110, a bank decoder 120, bank queues (130-0, 130-1, through 130-n), an ordering unit 140, a data buffer 150, a memory interface 160, and a timing controller 170. There may be a bank queue 130 associated with each memory bank in the memory subsystem 300 (FIG. 1). However, the bank queues 130 may also be configured to handle multiple banks.

Memory requests 102 enter the memory controller 100 on the memory request bus 240 and are received in the request queue 110 on a first-in first-out basis. As stated earlier, the request bus 240 bus may include control signals, address signals, data signals, unique identifiers for each requestor 230 (FIG. 1), and unique identifiers for multiple processors, or multiple processing threads within a requester 230. Many or all of these multiple signals may be stored in the bank queues 130 so the memory controller 100 can save and track the necessary information about each memory request while it is pending in the memory controller 100.

The bank decoder 120 processes the received requests in the sequence they entered the request queue 110 and the received requests are placed in one of the bank queues 130 based on, for example, bank and row address information. The ordering unit 140 tracks the information in the bank queues 130 and indicates to the memory interface 160 and timing controller 170 the order in which memory requests should be taken from the bank queues 130 and which bank queue 130 should supply the next memory access request. As will become apparent from the discussion below, the ordering unit 140 may include a sequence controller 142 for controlling the sequence (e.g., order) of the various memory requests within the bank queues 130. The ordering unit 140 may also include a read-modify-write (RMW) unit 144 for controlling RMW cycles. The RMW unit 144 can also be separate from the ordering unit 140. In this case, the bank decoder 120 can treat the RMW unit 144 as an internal bank, as can the ordering unit 140.

The memory interface 160 and timing controller 170 generate and control memory access requests 102 on the memory bus 280 with the proper timing and control based on the type of memory on the memory bus 280. As non-limiting examples, under direction from the ordering unit 140, the memory interface 160 and timing controller 170 may generate proper commands and bus cycles for pre-charge, activate, read, write, and refresh bus cycles for DRAMs on the memory bus 280.

The data buffer 150 may be configured as a single buffer capable of holding write data destined for the memory subsystem 300 (FIG 1), read data returned from the memory subsystem 300, read-modify-write data, or combinations thereof. The bank queues 130 may be separated into read queues and write queues (not shown) to enable easier tracking of writes relative to reads. This separation can assist in detection of which memory requests may be reordered, as is explained more fully below. In addition, write data can be placed, along with the respective memory write request, in the bank queues, and that data can be removed from the data buffer 150.

For write operations, the write data accompanies the memory request 102. Write memory requests are removed (i.e., de-allocated) from the appropriate hank queues 130 after the read or write command and associated write data has been launched on the memory control bus 172 and memory data bus 175.

For read operations, the memory request 102 on the request bus 240 does not include data. As a result, space in the data buffer 150 for the read request does not need to be allocated at the time the memory request 102 is placed in a bank queue 130. Instead, data buffer 150 space may be allocated when the read operation has been launched on the memory control bus 172 and the read data returns on the memory data bus 175. Alternatively, control logic can track the number of outstanding read requests and prevent further read requests if the read buffer is in danger of overflowing.

The read memory request 102 may remain pending in the bank queues 130 for a variety of different times depending on how the memory controller 100 is configured. As one example, the bank queues 130 may include all the request information such as type of memory cycle, originating requestor 230 (FIG. 1), originating process thread, and similar information that may be needed to return the data to its proper requestor 230. In this example, the data buffer 150 may simply include the read data and a tag indicating which entity made the respective request so data can be correctly returned on read bus 104. The ordering unit 140 uses the request information from the bank queue 130 and the associated data from the data buffer 150 to return the data to the proper requester 230 on the request bus 240. After returning the data, the memory request and associated read data may be removed (i.e., de-allocated) from the appropriate bank queue 130 and data buffer 150, respectively.

As another example, at the time a read request is processed on the memory bus 280, the request information may be transferred to the data buffer 150 such that the request information is in the data buffer 150. In this scenario, the memory request may be removed from the bank queue 130 when the request is processed on the memory bus 280 because all the information to return the read data to the proper requester 230 is in the data buffer 150. The ordering unit 140 uses the request information and the associated data from the data buffer 150 to return the data to the proper requestor 230 on the request bus 240. After returning the data, the memory request and associated read data may be removed (i.e., de-allocated) from the data buffer 150.

An efficient memory system seeks to keep its data pins full with useful data as close to 100% of the time as possible. To that end and unless stated in the discussion below, memory operations are considered "closed bank" operations. In other words, all memory references are pre-charged at the end of the reference. Even though there may be additional overhead associated with having to perform more row address select operations, closed bank operations are useful because of the randomness of the request streams in multiprocessor and multi-threaded system environments. Even if a thread is making an ordered stream of requests, as seen by the memory controller 100 and the memory system there are so many other requests interleaved from other threads that there is little chance that a second request from the original thread is seen before other requests have invalidated the open page that the thread was referencing.

This closed bank policy is different from conventional memory controllers that are generally used in single processor systems. In those conventional memory controllers an open bank policy is used because it is very likely that temporally close accesses from the requestor 230 will be to the same banks and same pages within those banks.

However, in some cases, it may be advantageous to recognize accesses to a same DRAM page and bypass the pre-charging operation such that back-to-back operation to the same page are open bank and can be made more efficiently. To enhance this ability to recognize memory requests to a same page and leave the bank open for a subsequent access, it may be useful to reorder the memory requests relative to the received order in the request queue 110.

In a single processor system, a memory controller can be designed to keep requests in he order that they are made because the data coming from memory is exactly in the order that the single processor wants them. Maintaining this order, however, is often not efficient for the memory system (i.e., memory bandwidth may be lost). However, given multiple cores, and even multiple threads in the same core, there will be memory system performance issues that may result from keeping requests in order.

In general, there are few issues of program correctness resulting from requests being returned in an unordered way as long as order is kept for references to the same memory address. For the most part, synchronization and forced-ordering instructions are added to processor's instruction sets to enable data and program ordering as needed to coordinate activity between cores and threads if the instructions do not already exist. Compiler writers and similar low-level programs thus worry about most ordering issues. It is true that sometimes program synchronization functions are added into a system's memory architecture, as is noted below in the discussion of atomic and byte-enable capability in a memory system.

Even if each core's, or thread's, requests must be kept in strict program request order, if a memory controller 100 can tell that a request is from this or that thread or core (based on information on the request bus 240), it can keep requests for each program stream in order while allowing non-conflicting requests (requests from differing cores and Breads) to go out of order with respect to each other. In addition, the controller uses this source information to route read data back to the requesting source or to indicate an error if that should occur.

In this reordering policy, if an "older" request in the bank queues 130 is to a busy bank, a request for a bank that is free may be chosen to precede that older request (as long as the other memory timing and usage rules are followed). This reordering makes productive use of bus time that may otherwise be unused.

In addition, an incoming memory request from the request queue 110 may be compared against other memory requests in the appropriate bank queue to determine if the new memory request is to a same page as one of the other pending requests. If so, the new memory request may be placed after that pending request to the same page. In this case, the closed bank policy may be overridden to allow back-to-back accesses to the same page.

Of course with reordering, some requests may be postponed or moved more that once. Thus, the ordering unit 140 may include a timing unit, or similar mechanism, to indicate the age of requests in the queue and modify an "old" request to have a higher priority and be executed in a timely manner.

It may take multiple memory clocks to turn around the data bus when switching data directions between read cycles and write cycles. If the turn around time is two clocks, with each data transfer taking four clocks (assuming bidirectional DDR transfers and burst-of-8 data requests for DRAMs), then 33% of the peak memory bandwidth may be lost if requests alternate between reads and writes. Thus, if memory reads are grouped together with other memory reads, and memory writes are grouped together with other memory writes, the inefficiencies due to bus turn around time can be reduced.

Generally, both read and write type memory access requests may be reordered. However, the memory controller 100 may implement a policy that write requests only be rearranged if necessary to the extent that the reordered sequence does not create any addressing conflicts with earlier received requests or otherwise interfere with the data stored or to be stored in the relevant memory locations due to other memory access requests in the bank queues 130. Also, references to the same program address must be kept in program request order. This request order is generally enforced by software if between different program entities, but is assumed to be followed by the memory controller 100 if done by a single request source (e.g., core or thread).

As another read versus write policy, it may be useful to give read groupings priority over write groupings. In other words, any reads may be assigned priority until something (e.g., queue full or address conflict) forces a switch to writes. This read priority policy may reduce read latency as viewed from the requesters 230 at the expense of including logic to verify that a read request is not reordered ahead of a write request to the same address to ensure that the read request gets the data from the pending write that is ahead in the queue. However, in some embodiments if a read is performed to an address with a pending write, the memory controller 100 may return the write data directly from the appropriate queue so memory is not actually read.

Processors, or other requestors 230, sometimes have the need to write individual bytes and perform read-modify-write operations. While it might seem that individual small data quantities are not written very often, these operations will increase as the number of cores and threads increase when they are working on common programs. One of the best ways for multiple threads to communicate is to use "atomic" memory operations such as flags and semaphores stored and managed as part of the memory system. These flags and semaphores generally require memory byte-level or word-level operations to work well.

Read-modify-write (RMW) is an atomic sequence that reads a value from a memory address, modifies the value that was read, and then writes the modified value back to the memory address. A conventional approach to multi-threaded programming is to use RMW locks to synchronize access to shared resources. Synchronization primitives such as semaphores may be used by multi-threaded programs to ensure that certain sections of code do not execute concurrently if doing so would corrupt memory structures the may be shared between the sections of code. If one thread attempts to acquire a lock that is already held by another thread, the thread will block until the lock is free.

Non-blocking algorithms may use atomic read-modify-write operations such as, for example compare and swap (CAS). The compare-and-swap CPU instruction (or the CMPXCHG instruction in the x86 architecture) is a special instruction that atomically compares the contents of a memory location to a given value and, if they are the same, modifies the contents of that memory location to a given new value. CAS may be used to efficiently implement semaphores in multiprocessor systems.

Conventionally, support for byte writes and semaphores has been done in execution logic in the processor or with logic in the processor's data caches. However, in some systems it may be useful to support writing of these small operands as individual data items to the final memory destination (i.e., memory subsystem 300) and not as part of an entire cache line.

In addition, many processors use 32-bit and 64-bit data items and those types of items may be written quite often. But, as a non-limiting example, a typical DRAM protocol and interface may move 32-byte bursts If only four bytes are need to be written, individual byte-write-select signals may be needed. However, in some memory systems, byte enables may not be available. In these systems, it may be necessary to read in, for example, a 32-byte burst that contains the 4-byte data item. Then, the four data bytes are inserted into the 32-bytes worth of data and the modified 32-byte quantity is then rewritten back to memory. In this example, 64 bytes of data have been both read and written when four bytes could have otherwise been sent if byte-enable capability existed in the interface. This movement of unneeded data is sustained, but wasted, memory performance. In general, the width of a memory access is referred to herein as a "data width." As non-limiting examples, this data width may be the physical bit width of the memory bus 280 or the width of a memory burst cycle. In addition, unless specified herein, RMW operations will generically refer to the specific RMW operations as well as writes to portions of a data width.

Thus, for RMW operations, the controller 100 may be configured to manage these partial write operations. In addition, a data buffer in RMW unit 144 may be configured to hold reserved areas for these RMW operations so that the data to be read is present in the memory controller 100, which may eliminate the need to perform a read operation on the memory bus 280.

Figure 3:
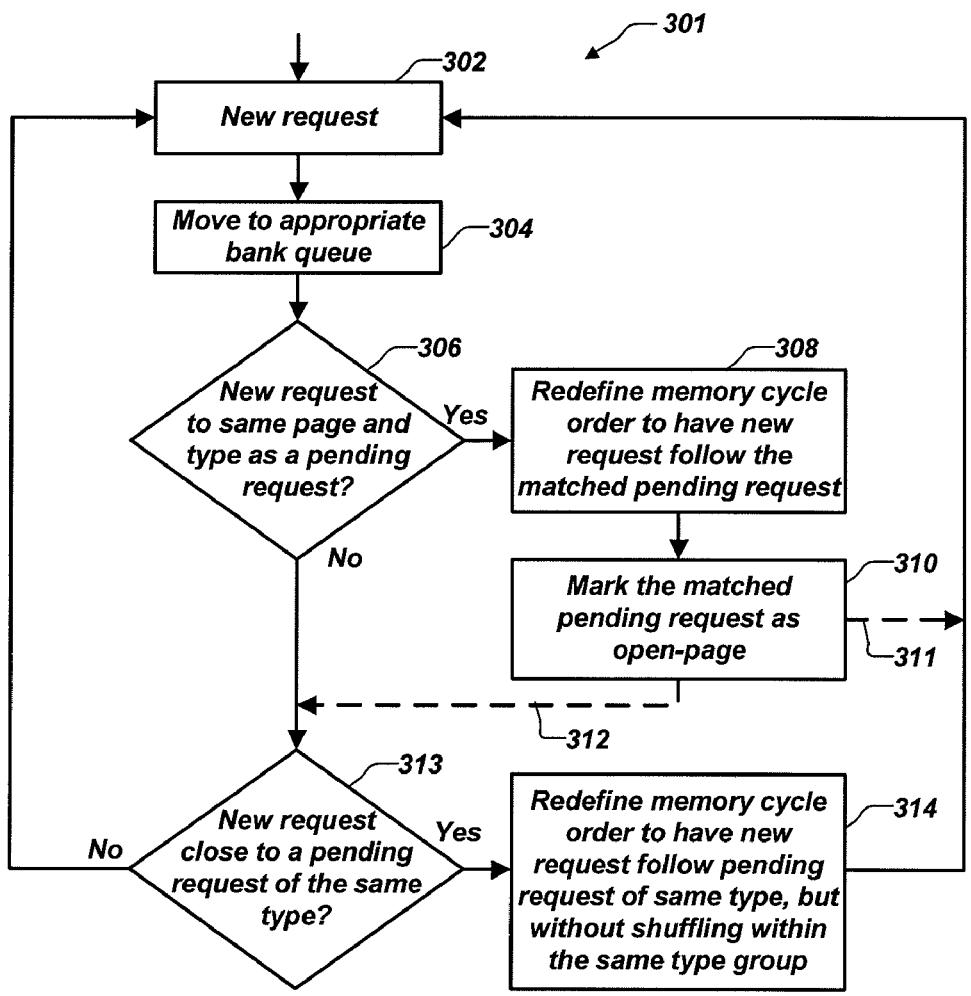
FIG. 3 is a simplified flow diagram illustrating a process for reordering memory requests.
Figure 4:
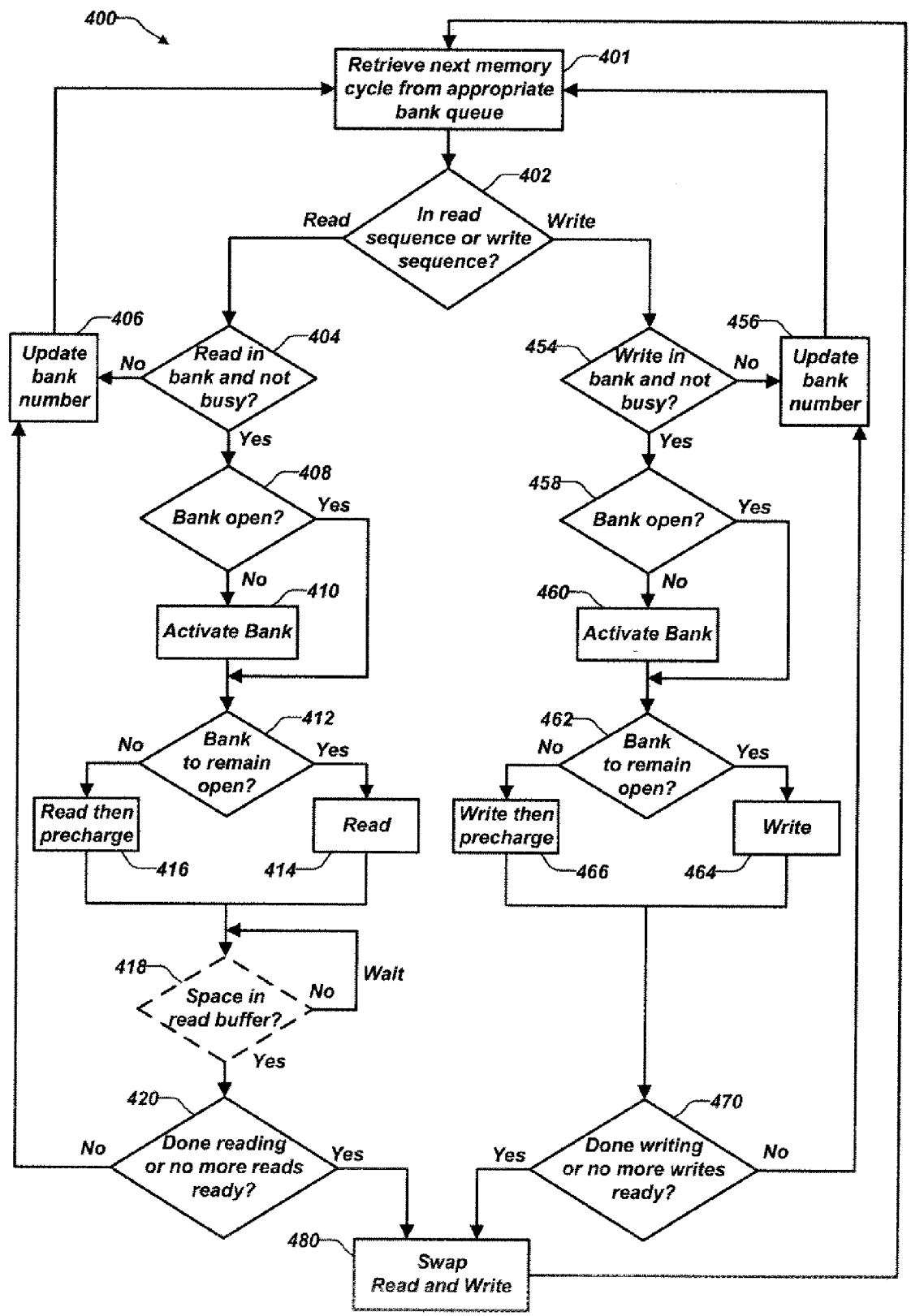
FIG. 4 is a simplified flow diagram illustrating a process for performing reordered memory requests.
Figure 5:
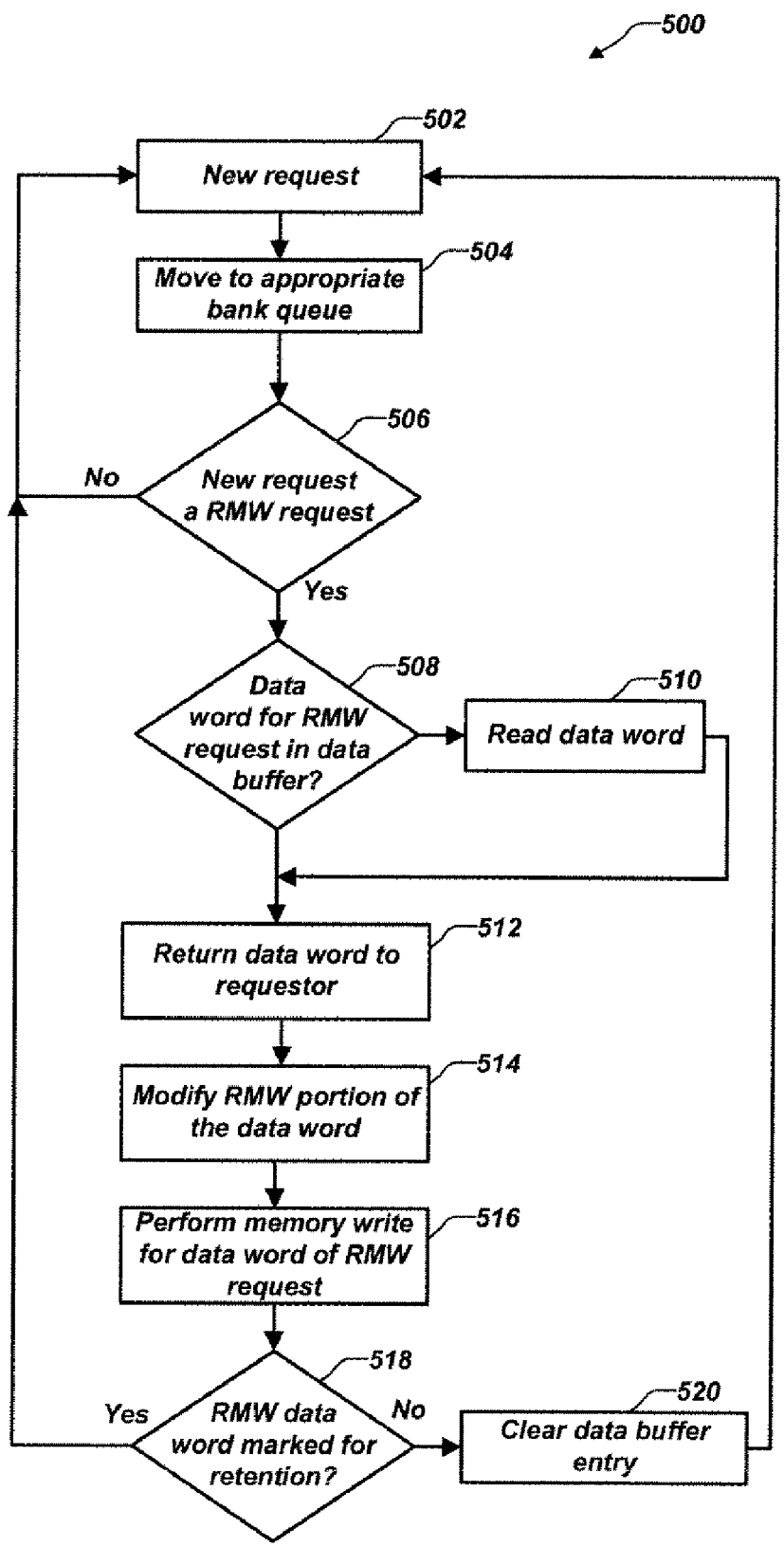
FIG. 5 is a simplified flow diagram illustrating a process for performing memory access requests for read-modify-write operations.

FIGS. 3, 4, and 5 are simplified flow diagram illustrating processes for managing reordered memory access requests and RMW operations according to embodiments of the disclosure. When describing FIGS. 3, 4, and 5, reference will also be made to various elements in FIGS. 1 and 2.

FIG. 3 is a simplified flow diagram illustrating a process 301 for reordering memory access requests. At operation block 302 a new request is received. Based upon the bank address, the request is moved to the appropriate bank queue at operation block 304. Decision block 306 determines if the just received request is temporally near any previous requests that are pending in the same bank queue and to the same bank and page as any previous requests that are pending in the same bank queue. Temporally near, as used herein, defines how far apart in time the requests were received at the request queue 110. The requests may be tagged with a time stamp, or have an age in queue attribute attached to them. In this manner, memory requests that are too far apart in time may not be reordered, or "old" memory requests may be assigned a high priority such that new requests are not placed in front of the "old" memory requests. The length of time apart or age in queue may be set as a configuration parameter of the memory controller 100.

If the request is to the same bank and page as another pending request, operation block 308 redefines the memory cycle order for that bank queue to place the new memory cycle directly after the other pending request to the same page. Of course, as stated earlier, a new read cycle should not be placed ahead of a write cycle to the same address, and a write cycle should not be placed ahead of a read or write cycle to the same address. In addition, there may be pending requests in the bank queue with a high enough priority based on age, or preference for read cycles, that the new request should not be placed ahead of the high priority requests.

Operation block 310 indicates that the pending request, for which the new request was placed directly behind, should be marked as an open-page request. In other words, for the marked request, the closed bank policy is overridden. Thus, after the request marked as open-page has been executed on the memory bus 280, the subsequent memory request is known to be to the same page and the two requests can be performed back-to-back without pre-charging and performing a row address strobe between them.

The reordering process 300 may include reordering for reads versus writes. If the reordering process does not include reordering reads versus writes, the process returns to operation block 302, via path 311, to wait for a new memory request. If the reordering process does include reordering reads versus writes, the process continues to decision block 313, via path 312. Decision block 313 determines if the new request is temporally close to a pending request of the same type, wherein the type may be a read request or a write request. If the request is not of the same type, the process returns to operation block 302 to wait for a new memory request.

If the request is of the same type as a temporally nearby memory request, operation block 314 redefines the memory cycle order for that bank queue to place the new memory cycle directly after the pending memory cycle of the same type. In this manner, the reorder process 300 may be used to group read and write cycles together to reduce the number of data bus turnaround cycles that may be required. In addition, reads may be given priority over writes to reduce read latency. Once again, cycles of one type should not be placed ahead of a different type to the same address. In addition, there may be pending requests in the bank queue with a high enough priority based on age, or preference for read cycles, that the new request should not be placed ahead of the high priority requests. After redefining the order of requests, the process returns to operation block 302 to wait for a new memory request. It is also possible to separate read and write requests into separate queues for each bank.

FIG. 4 is a simplified flow diagram illustrating a memory access process 400 for performing reordered memory requests on the memory bus 280 (FIG. 1). At operation block 401 a next memory request is retrieved from the appropriate bank queue. The appropriate bank queue may be determined by using a round-robin scheme or a prioritized selection based on bank queue. Alternatively, bank queue selection may use the policy of not selecting a request from a bank queue corresponding to a memory bank that is busy, as was discussed earlier.

Decision block 402 tests for whether the next memory request is a read or write. If the process is currently in a write sequence, operation continues at decision block 454, which is explained below. If the process is currently in a read sequence, operation continues at decision block 404, which determines if the request is a read and if the requested bank is not busy (e.g., being activated or pre-charged). If not, operation block 406 updates the bank number for the current read request and cycles to look at the next bank/queue.

Decision block 408 tests to see if the bank for the current read request is open. If the bank is not open, operation block 410 activates the bank. Decision block 412 tests to determine whether the control logic is set so that the bank should be left open at the conclusion of the current read request. If the bank is to remain open, operation block 414 performs the read cycle on the memory bus 280 (FIG. 2). If the bank is to be closed, operation block 416 performs the read cycle on the memory bus 280 (FIG. 2), while indicating, in the same command, that a precharge is needed after the read operation.

With the read cycle completed, some embodiments may include a wait decision block 418, which waits until there is space in the read buffer 154 (FIG. 2) to store the returned read data. Decision block 420 tests to see if the process is finished performing read cycles. The memory controller 100 may be configured to perform a certain number of back-to-back reads. This may be determined by a number of factors. As non-limiting examples, the factors may include the number of reads waiting in the queue, the number of reads waiting to execute relative to the number of writes waiting, the priority of writes waiting to execute, the priority of reads waiting to execute, and combinations thereof.

If read cycles are to continue, operation block 406 updates the bank number, if needed, for the next read cycle. If read cycles are not to continue, operation block 480 switches the current mode from performing read operations to performing write operations, and operation continues at operation block 401.

Returning to the exit from decision block 402, if the process is currently in a write sequence, operation continues at decision block 454, which determines if the request is a write and if the requested bank is not busy. If not, operation block 456 updates the bank number for the current write request and cycles to look at the next bank/queue.

Decision block 458 tests to see if the bank for the current write request is open. If the bank is not open, operation block 460 activates the bank. Decision block 462 tests to determine whether the control logic is set so that the bank should be left open at the conclusion of the current write request. If the bank is to remain open, operation block 464 performs the write cycle on the memory bus 280 (FIG. 2). If the bank is to be closed, operation block 466 performs the write cycle on the memory bus 280 (FIG. 2), while indicating, in the same command, that a precharge is needed after the write operation.

Decision block 470 tests to see if the process is finished performing write cycles. The memory controller 100 may be configured to perform a certain number of back-to-back writes. This may be determined by a number of factors. As non-limiting examples, the factors may include the number of writes waiting in the queue, the number of reads waiting to execute relative to the number of writes waiting, the priority of writes waiting to execute, the priority of reads waiting to execute, and combinations thereof.

If write cycles are to continue, operation block 456 updates the bank number, if needed, for the next write cycle. If write cycles are not to continue, operation block 480 switches the current mode from performing write operations to performing read operations, and operation continues at operation block 401.

If the memory cycle is not marked as open-page, the closed bank policy is followed and operation block 410 pre-charges the just accessed page and the process returns to operation block 402 to retrieve a next memory cycle from the appropriate bank queue.

FIG. 5 is a simplified flow diagram illustrating a process 500 for performing memory access requests for read-modify-write operations and partial data width writes, which may run somewhat in parallel with the reordering process 301 of FIG. 3. At operation block 502 a new request is received from request queue 110 (FIG. 2). Based upon the bank address, the request is moved to the appropriate bank queue at operation block 504. Decision block 506 determines if the just received request is a RMW request as identified by specific signals or commands from the request bus 240. If the request is not a RMW request, control returns to operation block 502 for the next request. In actuality, RMW process 500 and reordering process 300 run somewhat in parallel, so for non-RMW requests the reordering process 300 of FIG. 3 may continue at decision block 306.

If the request is a RMW request, decision block 508 determines if the entire data word for the addressed RMW location is already located in a data buffer in RMW unit 144 (FIG. 2). If the entire data word is not in that data buffer, operation block 510 performs a read operation on the memory bus 280 and stores the data word in the data buffer in RMW unit 144.

For conventional RMW operations, and not partial data write operations, operation block 512 returns the RMW portion of the data word to the requestor 230 if needed. Generally, the RMW portion that is returned is the read portion before the write has occurred. However, the memory controller 100 may be configured to return the RMW portion after the write has occurred. In addition, additional information may be returned with the RMW portion. As a non-limiting example, the comparison result of a compare and swap operation may be returned.

Operation block 514 writes the RMW portion of the data word into the RMW data buffer in RMW unit 144. If desired, operation block 516 writes the entire data word including the written RMW portion back to memory over the memory bus 280.

Decision block 518 tests to see if the RMW data word is marked for retention in the data buffer 150. As stated earlier, the RMW data buffer may be configured to maintain multiple RMW data words. In this way, it may be possible to avoid memory cycles on the memory bus 280 for RMW requests. If the data word is marked for retention, the process returns to operation block 502 to wait for the next request. If the data word is not marked for retention, operation block 520 clears the data word from the data buffer 150 to allow space for additional read or write data.

The RMW unit 144 may also be configured to always retain RMW values until space is needed for new RMW requests arriving at the memory controller, which may avoid writing to memory with each new request. If this retention is done, the reordering logic must create a write operation to memory, if needed. Thus, the retention, may allow postponing a write for each time a RMW value is updated, which often occurs for RMW values used for communication and updates between processes (e.g., between different cores, threads, and combinations thereof).

CONCLUSION

Embodiments of the present invention may include systems, memory controllers, and methods for controlling memory accesses operations. A processing system may include one or more requestors that perform memory requests to a plurality of memory devices. Each of the memory devices include at least one memory bank. A memory controller includes a request queue, a bank decoder, and a plurality of bank queues. The request queue receives memory requests from a requester and the bank decoder determines a destination bank based on a memory address accompanying the memory requests. The request is then placed in the appropriate bank queue.

An ordering unit determines if the current memory request can be reordered relative to a received order and generates a new memory cycle order based on the reordering determination. The reordering may be based on whether there are multiple requests to the same memory page within any given bank queue. The reordering may also be based on whether there are multiple requests of the same type, such as, for example, read requests and write requests. A memory interface executes each memory request in the memory cycle order defined by the ordering unit. The memory cycle order may be based on requests of the same type, requests to the same page, or combinations thereof. The ordering unit controls return of read data to the appropriate requestor in the original received order.

A data buffer holds read data that is returned from memory read cycles until the requested data is returned to the requestor. The data buffer may also hold memory words that may be used in read-modify-write requests from a requestor.

The ordering unit may also detect and control read-modify-write operations to a portion of a requested memory word. If the requested memory word is not present in the data buffer, the ordering unit directs the memory interface to execute a read of the requested memory word and store it in a data buffer. The ordering unit also controls returning the portion of the requested memory word to the at least one requester prior to being modified and modifies the portion of the requested memory word in the data buffer with data from the RMW request.

Although particular embodiments have been described, these described embodiments are non-limiting. Rater, the scope of the invention is encompassed by the appended claims and their legal equivalents.

What is claimed is:

1. A memory controller, comprising:
   a bank decoder for determining a destination bank of a memory for each memory request of a plurality of memory requests in a received order responsive to a memory address for each of the memory requests;
   a plurality of bank queues, each bank queue comprising at least a read queue and a write queue and for storing pending memory requests for a memory bank associated with that bank queue and tracking the received order;

an ordering unit for determining a memory cycle order different from the received order responsive to a presence of at least two memory requests in a same bank queue and to a same memory page; and a memory interface for executing each memory request in the memory cycle order.

2. The memory controller of claim 1, further comprising:
a data buffer for holding requested data from the memory until the requested data is to be returned to at least one requestor; and
a read-modify-write (RMW) unit for:
   detecting an RMW request to a portion of a requested memory word;
   if the requested memory word is not present in the data buffer, reading it from the memory and storing it in the data buffer; and
   modifying the portion of the requested memory word in the data buffer with data from the RMW request.

3. The memory controller of claim 2, wherein the RMW unit is further configured for retaining the requested memory word in the data buffer for future RMW requests.

4. The memory controller of claim 1, wherein the ordering unit is further configured for reordering at least two additional memory requests of the same type to occur sequentially, wherein the same type is selected from a group consisting of read requests and write requests.

5. The memory controller of claim 1, further comprising a data buffer for holding requested data from the memory until the requested data is to be returned to at least one requestor.

6. A memory controller, comprising:
a request queue for receiving memory requests in a received order from at least one requestor;
a bank decoder for determining a destination bank of a memory for each memory request in the request queue responsive to a memory address for each of the memory requests;
a plurality of bank queues for storing pending memory requests for a memory bank associated with a bank queue and tracking the received order;
a data buffer for holding at least one memory word with a data width corresponding to a data width of the memory;
a read-modify-write (RMW) unit configured for:
   detecting an RMW request to a portion of a requested memory word; and
   retaining the requested memory word in the data buffer for future RMW requests and writing the retained memory word to the memory after modifying the retained memory word in the data buffer; and
a memory interface for executing a read request to the memory responsive to the RMW request stored in one of the plurality of bank queues to retrieve the requested memory word if it is not present in the data buffer;
wherein the RMW unit controls returning the portion of the requested memory word to the at least one requestor prior to being modified and modifies the portion of the requested memory word in the data buffer with data from the RMW request.

7. The memory controller of claim 6, further comprising an ordering unit configured for determining a memory cycle order among temporally near non-executed requests based on a presence of at least two memory requests in a same bank queue and to a same memory page, and wherein the memory interface is further configured for executing each memory request in the memory cycle order.

8. The memory controller of claim 7, wherein:
the ordering unit is further configured for reordering at least two additional memory requests of the same type to occur sequentially, wherein the same type is selected from a group consisting of read requests and write requests; and
the memory interface is further configured for executing each memory request in the memory cycle order modified by the additional memory cycle order.

9. A processing system, comprising:
at least one requestor for performing memory requests;
a plurality of memory devices, each memory device comprising at least one memory bank; and
a memory controller operably coupled to the at least one requestor and the plurality of memory devices, the memory controller comprising:
   a request queue operable to receive memory requests in a received order from the at least one requestor;
   a bank decoder adapted to determine a destination bank of a memory for each memory request in the request queue in accordance with a memory address for each of the memory requests;
   a plurality of bank queues each bank queue comprising at least a read queue and a write queue and for storing pending memory requests for a memory bank associated with that bank queue and tracking the received order;
   an ordering unit adapted to determine a memory cycle order different from the received order by reordering at least two memory requests of the same type to occur sequentially, wherein the same type is selected from the group consisting of read requests and write requests;
   a memory interface for executing each memory request in the memory cycle order; and
   a data buffer for holding requested data from the memory pending return of the requested data to the at least one requestor;
   wherein the ordering unit is adapted to return the requested data to the at least one requestor in the received order.

10. The processing system of claim 9, further comprising a read-modify-write (RMW) unit for:
detecting an RMW request to a portion of a requested memory word;
if the requested memory word is not present in the data buffer, reading it from the memory and storing it in the data buffer;
modifying the portion of the requested memory word in the data buffer with data from the RMW request; and
returning the portion of the requested memory word to the at least one requestor prior to being modified.

11. The processing system of claim 10, wherein the RMW unit is further configured for writing the memory word to the memory after modifying the memory word in the data buffer.

12. The processing system of claim 9, wherein:
the ordering unit is further configured for determining an additional memory cycle order among temporally near non-executed requests based on a presence of at least two memory requests in a same bank queue and to a same memory page; and
the memory interface is further configured for executing each memory request in a memory cycle order modified by the additional memory cycle order.

13. A method for controlling memory access operations, comprising:
receiving a plurality of memory requests in a received sequence;

storing the plurality of memory requests in a plurality of bank queues each comprising at least a read queue and a write queue;
determining a destination bank of a plurality of memory banks for each of the plurality of memory requests;
detecting at least two memory requests of the plurality of memory requests to a same memory page among temporally near non-executed requests in the received sequence by comparing one request of the plurality of memory requests with at least another request of the plurality of memory requests;
reordering the received sequence in accordance with a detection result;
executing the at least two memory requests in the reordered sequence;
closing each memory page at a conclusion of a memory access to that memory page, if the memory access is executed in the received sequence; and
maintaining the same memory page open between the reordered sequence of requests.

14. The method of claim 13, further comprising:
detecting at least two additional non-executed memory requests of a same type among temporally near, but not sequential, non-executed requests in the received sequence, wherein the same type is selected from a group consisting of read requests and write requests; and
rearranging received sequence based on a result of detecting at least two additional non-executed memory requests of the same type.

15. The method of claim 13, further comprising:
detecting a read-modify-write operation to a portion of a memory word, wherein the memory word comprises a data width corresponding to a data width of the plurality of memory banks;
determining if the memory word is present in a memory controller;
reading the memory word into the memory controller from a memory if it is not present in the memory controller;
communicating the portion of the memory word to a requestor that initiated the read-modify-write operation; and
modifying the memory word in the memory controller with the portion of the memory word from the read-modify-write operation.

16. The method of claim 15, wherein the data width is selected from a group consisting of a memory bus width and a memory burst cycle data width.

17. A method for controlling memory access operations, comprising:
receiving a plurality of memory requests destined for a plurality of memory banks in a received sequence;
storing the plurality of memory requests in a plurality of bank queues each comprising at least a read queue and a write queue;
determining a destination bank of the plurality of memory banks for each of the plurality of memory requests;
detecting at least two non-executed memory requests of a same type among temporally near, but not sequential, non-executed requests in the received sequence by comparing one request of the plurality of memory requests with at least another request of the plurality of memory requests, wherein the same type is selected from the group consisting of read requests and write requests; and
sequentially executing the at least two memory requests of the same type.

18. The method of claim 17, further comprising:
detecting a read-modify-write operation to a portion of a memory word, wherein the memory word comprises a data width corresponding to a data width of the plurality of memory banks;
determining if the memory word is present in a memory controller;
reading the memory word into the memory controller from a memory if it is not present in the memory controller;
communicating the portion of the memory word to a requestor that initiated the read-modify-write operation; and
modifying the memory word in the memory controller with the portion of the memory word from the read-modify-write operation.

19. The method of claim 17, further comprising:
detecting at least two additional memory requests to a same memory page among temporally near non-executed requests in the received sequence; and
reordering the sequence of requests based on a result of detecting at least two additional memory requests to the same memory page.

20. The method of claim 19, comprising:
executing the at least two additional memory requests in the rearranged order;
closing each memory page within the plurality of memory banks at a conclusion of a memory access to that memory page, if the memory access is executed in the received sequence; and
maintaining the same memory page open between the rearranged sequence of requests.

21. The method of claim 17, further comprising:
monitoring a busy state of each memory bank in the plurality of the memory banks; and
executing a next memory request to a memory bank that does not indicate a busy state.

22. The method of claim 17, further comprising assigning a higher priority to the read requests relative to the write requests and executing the read requests ahead of the write requests when there are no address conflicts between the read requests and any pending write requests.

23. A method for controlling memory access operations, comprising:
receiving a plurality of memory requests destined for a plurality of memory banks in a received sequence;
determining a destination bank of the plurality of memory banks for each of the plurality of memory requests;
detecting at least two non-executed memory requests of a same type among temporally near, but not sequential, non-executed requests in the received sequence by comparing one request of the plurality of memory requests with at least another request of the plurality of memory requests, wherein the same type is selected from the group consisting of read requests and write requests;
reordering a sequence of the plurality of memory requests based on the detection result;
sequentially executing the at least two memory requests of the same type;
monitoring an age of a pending memory request;
increasing a priority of the pending memory request as it waits to be executed; and
preventing new memory requests from being reordered to occur before the pending memory request with a high priority.

* * * * *

UNITED STATES PATENT AND TRADEMARK OFFICE
CERTIFICATE OF CORRECTION

| | | |
|---|---|---|
| PATENT NO. | : 7,870,351 B2 | Page 1 of 1 |
| APPLICATION NO. | : 11/940745 | |
| DATED | : January 11, 2011 | |
| INVENTOR(S) | : David R. Resnick | |

It is certified that error appears in the above-identified patent and that said Letters Patent is hereby corrected as shown below:

IN THE CLAIMS:

In column 14, line 30, in claim 9, delete "the group" and insert -- a group --, therefor.

In column 15, line 62, in claim 17, delete "from the" and insert -- from a --, therefor.

In column 16, line 25, in claim 20, delete "rearranged order;" and insert -- reordered sequence; --, therefor.

In column 16, lines 30-31, in claim 20, delete "rearranged" and insert -- reordered --, therefor.

In column 16, line 53, in claim 23, delete "from the" and insert -- from a --, therefor.

In column 16, line 56, in claim 23, after "detection" delete "result".

Signed and Sealed this
Second Day of August, 2011

David J. Kappos
*Director of the United States Patent and Trademark Office*